United States Patent [19]

Rayner, Jr.

[11] Patent Number: 5,291,698
[45] Date of Patent: Mar. 8, 1994

[54] TARPAULIN AIR VENT SYSTEM

[75] Inventor: Richard W. Rayner, Jr., South Elgin, Ill.

[73] Assignee: Rayner Covering Systems, Inc., South Elgin, Ill.

[21] Appl. No.: 970,054

[22] Filed: Nov. 2, 1992

[51] Int. Cl.⁵ ............................................. E04D 1/34
[52] U.S. Cl. ......................................... 52/3; 52/2.14; 52/63; 296/100; 135/91; 454/174
[58] Field of Search ............ 52/2.13, 2.14, 2.17, 52/2.18, 2.24, 2.25, 4, 3, 63, 65; 296/100, 105, 43, 26; 135/91, 93, 94; 454/174, 182, 259, 359

[56] References Cited

U.S. PATENT DOCUMENTS

| | | |
|---|---|---|
| 2,635,562 | 4/1953 | Abramson . |
| 2,730,150 | 1/1956 | Wunderwald et al. . |
| 3,416,762 | 12/1968 | Headrick . |
| 3,727,656 | 4/1973 | Luders ............................. 52/63 |
| 3,924,364 | 12/1975 | Ferkens ........................... 52/2.17 |
| 3,949,527 | 4/1976 | Double et al. . |
| 4,000,749 | 1/1977 | Busco ............................. 52/2.18 |
| 4,084,358 | 4/1978 | Winters . |
| 4,121,389 | 10/1978 | Ptaszek ........................... 52/2.14 |
| 4,122,637 | 10/1978 | Runge et al. . |
| 4,413,029 | 11/1983 | Handwerker . |
| 4,455,790 | 6/1984 | Curle . |
| 4,625,468 | 12/1986 | Hampel ........................... 52/2.24 |
| 4,627,333 | 12/1986 | Anderson et al. . |
| 4,660,337 | 4/1987 | Ross, III et al. . |
| 4,726,286 | 2/1988 | Anderson et al. . |
| 4,897,970 | 2/1990 | Double et al. . |
| 4,915,022 | 4/1990 | Lynch ............................. 52/63 |

Primary Examiner—Carl D. Friedman
Assistant Examiner—Winnie Yip
Attorney, Agent, or Firm—Niro, Scavone, Haller & Niro

[57] ABSTRACT

A tarpaulin covering system for protecting a pile of material having an array of folded tubular vents connected to a tarpaulin to assist a weighting system on the tarpaulin in the prevention of aerodynamic lift. The vents remain in a folded state when the air pressure between the tarpaulin and the pile of material is minimal. During a period of increased air pressure, the vents in the area of increased air pressure open allowing for the escape of the entrapped air. The venting system prevents a protective tarpaulin from being lifted off the surface of the material pile which may cause damage to the tarpaulin resulting in an decrease in the overall integrity of the protective tarpaulin system.

5 Claims, 1 Drawing Sheet

TARPAULIN AIR VENT SYSTEM

BACKGROUND OF THE INVENTION

The present invention relates generally to a tarpaulin covering system. More specifically, the present invention relates to a unique tarpaulin cover system having novel air venting capabilities, the entire system being ideally suited for the protection of large piles of material.

Many tarpaulin systems have been developed for covering large piles of particulate material such as salt, grain, sand and the like. These systems are intended to protect the covered material from the elements and must be designed to withstand many environmental fluctuations. Examples of such prior art tarpaulin covering systems are disclosed in U.S. Pat. Nos. 3,949,527; 4,413,029 and 4,455,790.

The earliest forms of pile covering systems simply used large sheet of canvas to protect the contents of the piles from the elements. In recent years, a trend away from canvas to synthetic fabrics has occurred. Materials such as polyethylene and nylon have proven more suitable for pile coverings due to reduced weight, greater maneuverability on the pile during installation, and lower cost. These synthetic materials are also more waterproof (impermeable to water). On the other hand, these same synthetic materials are also gas impermeable, with the result that air can be trapped between the pile material and the cover causing undesirable floatation and misalignment of the cover. In addition, wind gusts which penetrate the cover's perimeter seal can actually lift, move or tear portions of the cover. Accordingly, a need exists for a synthetic, gas and water impermeable pile covering system which is not subject to these aforementioned problems. It is therefore desirable to have a tarpaulin covering system that provides a simple and inexpensive venting mechanism as a release for air trapped between the pile and the tarpaulin while maintaining its liquid impermeable characteristics.

SUMMARY OF THE INVENTION

The present invention provides new advantages not found in currently available tarpaulin systems, and overcomes disadvantages of such currently available systems.

The invention is generally directed to a novel and unique tarpaulin system for protecting a stored product from the elements. The present invention is particularly well suited for protecting a pile of material that may be subjected to gusts of wind which, in prior art tarpaulin systems, would cause the tarp to lift from the pile otherwise diminish the integrity of the pile covering. This problem is of particular concern because the tarpaulins are often manufactured of long panels of materials which are sewn or heat sealed together to form the complete tarp and, as a result, susceptible to separation.

To solve this problem, the present invention employs an array of specially designed vents in the tarpaulin to permit the escape of air trapped between the pile and the tarp. The array of vents of the present invention is preferably used in conjunction with a conventional weight and weight retaining strap webbing arrangement. However, the present invention a be employed without such a weighting arrangement. The present invention includes vents disposed directly on the surface of the tarp to greatly assist the weight and strap arrangement in the prevention of aerodynamic lift.

Each of the vents of the present invention is preferably formed from a circular hole cut into the tarp. The sock-type vent of the present invention is preferably substantially cylindrical in shape to correspond with its corresponding hole cut into the tarp and may be made of the same material as the tarp or may be a different material. The cylindrical vent, having a diameter substantially the same as the circular hole. One of its ends is sewn, heat sealed or otherwise joined to the perimeter of the corresponding circular hole cut in the tarp. However, the vent may be manufactured in other shapes and configurations.

The vent includes a folded portion at an intermediate location along its length, preferably formed by joined wall segments from the periphery of the vent inward on each side. Therefore, a passageway of reduced cross sections remains within the vent to permit escape of air. As a result of the joined walls, a proximal portion of the vent stands generally upright while the distal portion is folded so that the open end faces toward the surface of the tarp.

When the air pressure between the tarp and the material is minimal, the vent will remain in this folded state. Since the opening of the vent faces toward the tarp, the entry of water, is practically impossible. In the event that air pressure between the tarp and the material pile increases, tension is increased throughout the weight and webbing retaining arrangement and the vent becomes generally erect causing the distal portion or the vent to be extended permitting escape of air which results in a reduction of the tension. When air pressure again decreases, the distal portion of the vent can return to its folded state. As wind conditions change, the vents of the present invention can react accordingly. Each vent of an array of such vents on a tarp has the capability of reacting independently from the others in response to varying air conditions at different regions of the tarp.

It is therefore an object of the present invention to provide a tarpaulin air vent system.

Another object of the invention is to provide a tarpaulin air vent system which permits the escape of air from between a tarpaulin and the material pile it is covering and protecting.

It is a further object of the invention to provide a tarpaulin air vent system that is liquid impermeable while permitting the escape of air from between the tarpaulin and the material pile.

It is another object of the invention to provide a tarpaulin air vent system that assists a weight and weight retaining webbing arrangement in the prevention of aerodynamic lift.

It is yet another object of the invention to provide a tarpaulin air vent system having a folded cylindrical vent member which is limp during minimal air flow and erect during increased air flow to permit escape of the air.

A further object of the invention is to provide a tarpaulin air vent system that may accommodate high air flows and prevent the tarpaulin from lifting from the pile.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
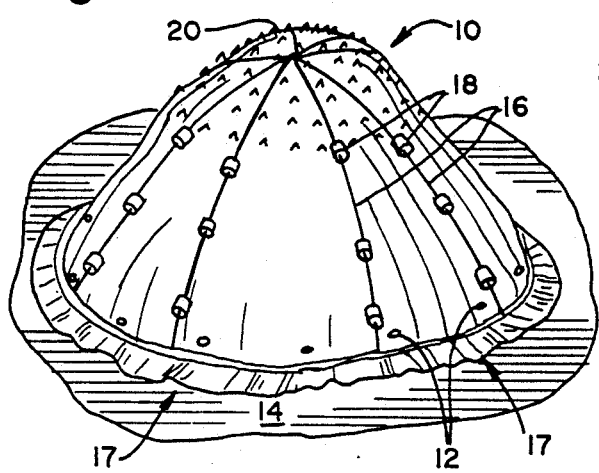
FIG. 1 is a perspective view of the tarpaulin covering system of the present invention.

Referring to FIG. 1, the tarpaulin covering system 10 of the present invention is generally shown. Tarpaulin 11 is positioned over a pile or mound of material to be covered and protected, such as a salt or sand pile. The air vent system of the present invention is well suited for use with tarpaulins 11 that are manufactured of non-porous materials, such as polyethylene as well as coated and laminated nylon fabrics. The invention may also be employed in tarpaulin systems manufactured of porous materials such as canvas.

Still ref erring to FIG. 1, the system is anchored to the ground 14 at its perimeter by conventional anchoring means. To initially prevent aerodynamic lift, the tarpaulin includes a number of weights 18 which are secured to the tarpaulin by a series of weight retaining strips 16 of cloth strapping or the like. Such an arrangement is well known in the art, however, it is inadequate to completely prevent aerodynamic lift. To more efficiently and completely prevent aerodynamic lift, the present invention includes an array of vents 20 on the tarpaulin to provide a release or escape route for air flow in the event wind gusts penetrate the perimeter 17 of the covering. Such venting prevents the tarpaulin from lifting off the pile and uprooting anchors 12 and greatly assists the weight and strapping arrangement in the prevention of aerodynamic lift. It also minimizes the possibility that the covering will be ripped or otherwise damaged by high winds.

In FIG. 1, the vents 20 are preferably positioned at the top twenty-five percent of the tarpaulin 11. Further, it is preferred that the vents have a size of approximately 6-18 inches in diameter, a length of approximately 8-20 inches, and that the vents be spaced from one another on the tarpaulin 11 at a distance of about 5-15 feet. However, various combinations of size, location, spacing and concentration may also be realized with the present invention. For example, vents 20 may be positioned on the entire surface of the tarpaulin 11.

Figure 4:
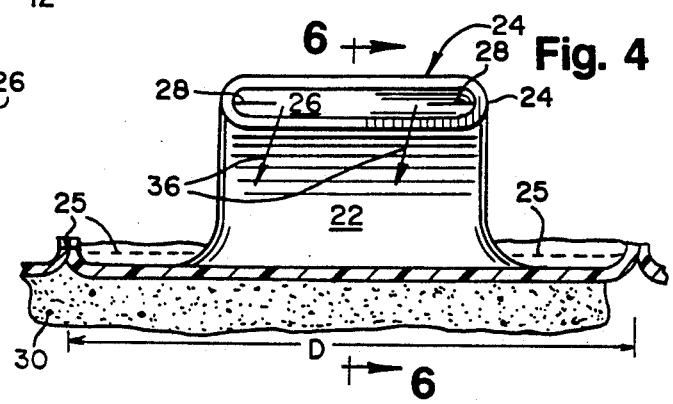
FIG. 4 is a front view of the vent of FIG. 3.

Vent 20 is preferably substantially cylindrical in shape but may be formed in other configurations. As shown in FIG. 4, a hole, having a diameter D, matching the diameter of the vent is cut into the tarpaulin 11. The vent 20 is then attached to the tarpaulin 11 so that the periphery of one of its open ends mates with the periphery of the hole. The vent 20 is preferably attached to the tarpaulin 11 by stitching 25 by a sewing machine or heat seal by a heat sealing tool or machine.

Figure 2:
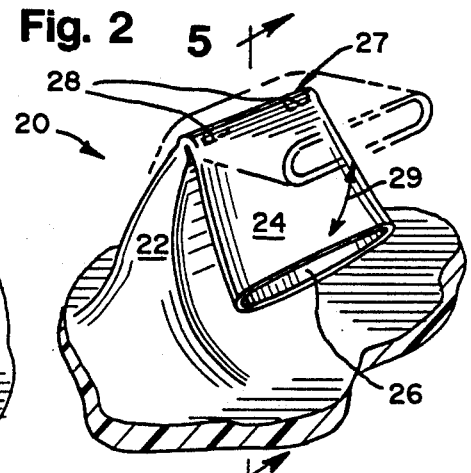
FIG. 2 is a perspective view of one of the vents employed in the tarpaulin covering system of FIG. 1.
Figure 3:
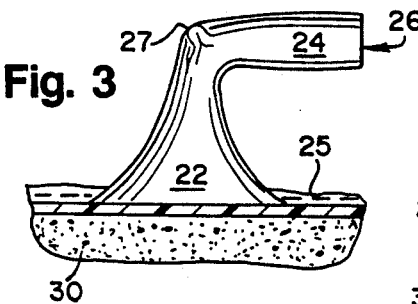
FIG. 3 is a side View of the vent of FIG. 2 in a state permitting the escape of trapped air.

Turning now to FIG. 2, a perspective view of one of the vents 20 of the present invention is shown. The cylindrical vent is most preferably about 14 inches long but may of other lengths in accordance with the particular application. The vent 20 is folded approximately at an intermediate point along its length creating an input portion 22 and an output portion 24. The input portion 22 of the vent 20 is the half of the vent 20 that is attached to the tarpaulin. In the region of fold 27, two segments of stitching 28 are preferably provided transversely across the vent 20 from the outer edges of the vent inward. The length of stitching segments 28 may vary but 4 inches on each side is preferred. Segment 28 penetrates through each of the four layers of material present at fold 27 to effectively pinch off the vent 20 on each side. Other means, such as a heat seal, staples or the like may be sued instead of stitching 28 to pinch off the vent. As shown in FIG. 2, the vent 20 is flexible allowing output portion 24 to move freely as indicated by arrow 29.

Figure 5:
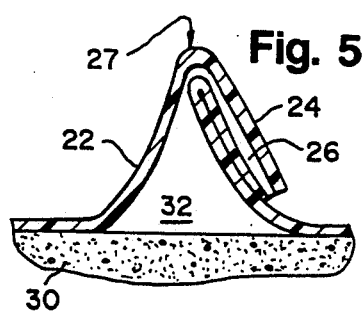
FIG. 5 is a cross-sectional view through line 5—5 of FIG. 2.

Turning now to FIG. 5, the vent 20 of the present invention is shown where there is a lack of any significant air pressure between the tarpaulin 11 and the pile of material 30. In this state, the vent 20 is relatively limp where output portion 24 is in a lowered or non-erect position. Input portion 22 remains relatively upright forming a chamber 32. In this state, the venting characteristics are not needed due to a lack of air pressure under the tarpaulin. Due to the unique structure of the vent 20 does not diminish the ability of the tarpaulin to protect the material 30 from the elements. Rain or snow flows over vent 20 but does not enter because output portion is folded over with exit 26 facing downward.

Figure 6:
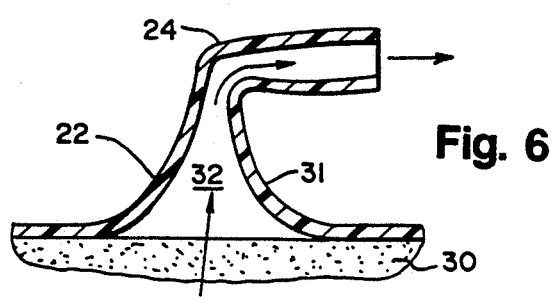
FIG. 6 is a cross-sectional view through line 6—6 of FIG. 4.

As shown in FIG. 6, a side cross-sectional view, the vent becomes erect when air pressure under the tarpaulin rises sufficiently, allowing air to escape from beneath the tarpaulin as represented by arrows 31. As air pressure builds within chamber 32 in input portion 22, vent 20 will become erect causing output portion 24 to elevate opening up a clear path for the air exit. The air flows through the region of the vent 20 not pinched off by stitches 28. The power of the air flow itself will lift the output portion of the vent 20 as much as needed to permit escape of the air. Air flows through the central portion of the vent because the lateral edges of the vent 20 are pinched off by stitching 28 which also maintains vent 20 in a folded position when no air current or wind is present.

Overall, the tarpaulin air vent system of the present invention reduces the requirements of weighting and strapping systems to prevent the tarpaulin from lifting off the surface of the material pile. The vent system permits air to escape avoiding the accumulation of air beneath the tarpaulin. The vent system's unique folded design closes the vent during periods of non-flow of air. Each of the vents disposed on the tarpaulin act independently of one another automatically without adjustment. Further, the vent 20 of the present invention only unfolds as is necessary to vent the particular amount of air flow. Therefore, each vent 20 simultaneously and independently react to varying air pressure conditions at different regions beneath the tarpaulin 11.

It will be appreciated by those skilled in the art that various changes and modifications can be made to the illustrated embodiments without departing from the spirit of the present invention. All such modifications and changes are intended to be covered by the appended claims.

What is claimed is:

1. A pile covering system for protecting a pile of material comprising:

a cover sheet constructed from a substantially water impermeable material;

a plurality of apertures formed in said cover sheet;

a plurality of tubular vents constructed from a flexible material; each said vent having a proximal end joined to said cover sheet to overlie one of said apertures, a distal open end, and an intermediate portion between said proximal and distal ends having opposing transversely facing joined wall segments to form a foldable reduced cross-section passageway at said intermediate portion for closing of said vent but otherwise permitting air flow from beneath said cover sheet.

2. The pile covering system of claim 1, wherein said vents are spaced about 5 to 15 feet apart.

3. The pile covering system of claim 1, wherein said vents occupy the top 25 percent of said cover sheet.

4. The pile covering system of claim 1, wherein each said vent is about 6 to 18 inches long.

5. The pile covering system of claim 1, wherein each said vent is about 8 to 20 inches long.

* * * * *